United States Patent
Shrinkle

(12) 
(10) Patent No.: US 6,222,692 B1
(45) Date of Patent: Apr. 24, 2001

(54) APPARATUS AND METHOD FOR CONTROLLING THE FREQUENCY AT WHICH DATA IS WRITTEN IN A DISK DRIVE SYSTEM

(75) Inventor: Louis J. Shrinkle, Leucadia, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1057 days.

(21) Appl. No.: 08/610,976

(22) Filed: Mar. 1, 1996

Related U.S. Application Data

(63) Continuation of application No. 08/352,545, filed on Dec. 9, 1994, now abandoned.

(51) Int. Cl.$^7$ ........................................ G11B 5/09
(52) U.S. Cl. ............................................ 360/51; 360/46
(58) Field of Search ............................. 360/51, 40

(56) References Cited

U.S. PATENT DOCUMENTS

| | | | |
|---|---|---|---|
| 4,736,238 | * 4/1988 | Moriyama et al. | 348/498 |
| 5,062,091 | 10/1991 | Maeda et al. | 369/13 |
| 5,193,034 | * 3/1993 | Tsuyoshi et al. | 360/51 |
| 5,231,545 | * 7/1993 | Gold | 360/40 X |
| 5,278,815 | * 1/1994 | Mashimo et al. | 360/51 X |
| 5,307,028 | * 4/1994 | Chen | 360/51 X |
| 5,369,553 | * 11/1994 | Ottesen et al. | 360/51 |
| 5,535,067 | * 7/1996 | Rooke | 360/51 |

FOREIGN PATENT DOCUMENTS

| | | |
|---|---|---|
| 0 485 234 A2 | 5/1992 | (EP) . |
| 0 586 236 A2 | 3/1994 | (EP) . |
| 0 611 155 A2 | 8/1994 | (EP) . |
| 0 618 574 A2 | 10/1994 | (EP) . |
| WO 94/08394 | 4/1994 | (WO) . |

OTHER PUBLICATIONS

IBM Technical Disclosure Bulletin, IBM Corportion, "Write Data Circuits with Sample Sector Servo", vol. 34, No. 7A, Dec. 1991, New York, U.S.A.

* cited by examiner

*Primary Examiner*—David Hudspeth
*Assistant Examiner*—Regina Y. Neal
(74) *Attorney, Agent, or Firm*—Shawn B. Dempster; Edward P. Heller III

(57) ABSTRACT

An apparatus and method for controlling the frequency at which data is written in a disk drive system is disclosed. Data is written into a record stored in a disk drive system at a frequency which is controlled by a clock signal that accounts for the frequency of format data in the record to be written and the rotational speed of a disk in the disk drive system. The clock is generated by a phase locked loop which receives format data read from the record to be written and a compensation factor received by monitoring rotational speed of the disk, resulting in data being written with a frequency and phase equal to the frequency and phase that the format data read from the record to be written would have had if the disk were rotating at its nominal speed.

11 Claims, 3 Drawing Sheets

APPARATUS AND METHOD FOR CONTROLLING THE FREQUENCY AT WHICH DATA IS WRITTEN IN A DISK DRIVE SYSTEM

This application is a continuation of Ser. No. 08/352,545, filed Dec. 9, 1994, now abandoned.

CROSS-REFERENCE TO RELATED APPLICATIONS

DIGITAL DATA PHASE DETECTOR, Ser. No. 08/353,553, filed Dec. 9, 1994 now U.S. Pat. No. 5,504,790, assigned to the assignee of the present application which is hereby incorporated by reference.

BACKGROUND OF THE INVENTION

The present invention is generally related to read/write channels in hard disk drives and disk drive electronic control systems. In particular, the present invention relates to controlling the frequency at which data is written onto a disk in a disk drive system.

Disk drive systems, as shown in FIG. 1, include a microprocessor 9 for controlling the overall operation of the disk drive system, a read channel 10 for recovering data read from the disk, a write channel 12 for writing data onto the disk and a digital phase locked loop 11 for providing a read clock to the read channel 10 and oscillator 13 operating as the write clock for the write channel 12.

During a write operation, the phase locked loop 11, in response to control signals from microprocessor 9 on bus 17, locks up on a frequency determined by the frequency of reference oscillator 13 in preparation for the next read operation. Oscillator 13 provides the write clock on line 19 to write channel 12 which, in response to control signals on bus 19 from microprocessor 9, generates write data on line 23 from the data to be written on line 22.

The disk drive system's spindle motor (not shown) operates at a nominal speed with a speed tolerance of +/–1%. This variation in speed affects both the frequency of the data written onto the disk and the frequency of the data read from the disk. If the speed of the spindle motor increases by +1% then the data written on the disk will have a shorter wavelength than data that would have had been written with the spindle motor operating at the spindle motor's nominal speed. If the same data is read back from the disk with the spindle motor operating at the spindle motor's nominal speed, the resulting frequency of the recovered data will be 1% higher than the frequency of the write clock.

FIG. 3 shows a format of a data record as recorded on the disk. The data record is comprised of a format area comprising the servo preamble field, the address mark field, the gray code field, the servo data field, the I.D. VFO field, the I.D. sync field and the I.D. field which are written when the disk is originally formatted and a data area comprising the data VFO field, the data sync field, the data field and the error correction code (ECC) field which are written whenever a record is written by write channel 12. The number of bytes of data in each of the above fields is shown directly below each field in FIG. 3.

Returning to FIG. 1, during a read operation the data read from the disk are received by read channel 10 on line 14 and selected portions of the read data is provided on line 20 to digital phase locked loop 11 under control of control signals on bus 16 from microprocessor 9. The phase locked loop 11, in response to control signals on bus 17 from microprocessor 9, locks up on a frequency determined by the frequency of the data received on line 20 from read channel 10 to generate the read clock. Read channel 10, under control of control signals on bus 16 from microprocessor 9, uses the read clock on line 21 to provide detected data on line 15 derived from the read data on line 20.

Returning to FIG. 3, during a read operation the read gate is enabled to allow VFO data from the I.D. VFO field and the data VFO field to be provided to the phase locked loop 11 such that phase locked loop 11 will acquire at the frequency of the VFO data in the two VFO fields.

Since the two VFO fields were written at different times, the frequency of the VFO data recovered from the format VFO field can be different than the frequency of the VFO data recovered from the write VFO field.

The read gate for a write operation is shown to be activated during the I.D. field to allow the read channel 10 to ascertain if the record being sensed is the record being addressed in either a write or read operation. The write gate for a write operation is shown to be enabled during the data area of the record which includes a splice field which allows time for the disk drive system to recover from deactivating the read gate and activating the write gate during a write operation.

The number of bytes of data in the I.D. VFO field and the data VFO field is determined by the amount of time required for the phase locked loop 11 to acquire synchronization in frequency and phase with the read data in the worst case situation. The worst case situation is where the data in the data area of a record is written and read at the extremes of the speed tolerance of the spindle motor, that is to write data with the spindle motor's speed 1% fast and to read that same data with the spindle motor's speed 1% slow or vice versa. In the worst case situation the phase locked loop 11 would have to acquire a frequency that is 2% higher or lower than the write clock frequency.

SUMMARY OF THE INVENTION

Briefly, the present invention provides an apparatus and method which will cause a write clock to be generated by the phase locked loop which acquires the frequency of the data read from the I.D. VFO field, the I.D. sync field and the I.D. field for the record to be written and then maintains that acquired frequency for the write clock during the writing of the data area (the data VFO field, the data sync field, the data field and the ECC field data) into the record to be written. This results in the data being written into the data area of the record at the same frequency as the data in the format area of the record being written.

An advantage of the present invention is that data written in the data area (the data VFO field, the data sync field, the data field and the ECC field) of a record will be at the same frequency as the data read from the format area (the I.D. VFO field, the I.D. sync field and the I.D. field) of that same record during a write operation.

Another advantage of the invention is that the time required for the phase locked loop to acquire frequency and phase of the data being read during a read operation is reduced.

An advantage of the invention is the increase in speed for the phase locked loop to acquire frequency and phase lock with the data read from a data record during both a read and write operation.

Another advantage of the invention is that the length of the I.D. VFO field and the data VFO field may be shorter in length.

BRIEF DESCRIPTION OF THE DRAWINGS

The invention will be described with respect to the particular embodiments thereof and reference will be made to the drawings, in which.

DETAILED DESCRIPTION OF THE INVENTION

Figure 1:
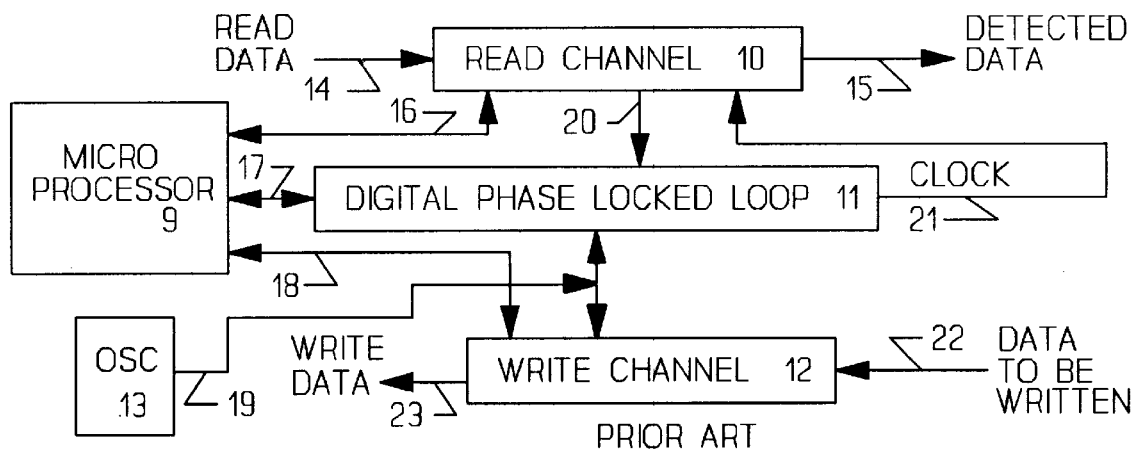
FIG. 1 is a block diagram of a prior art disk drive system.
Figure 2:
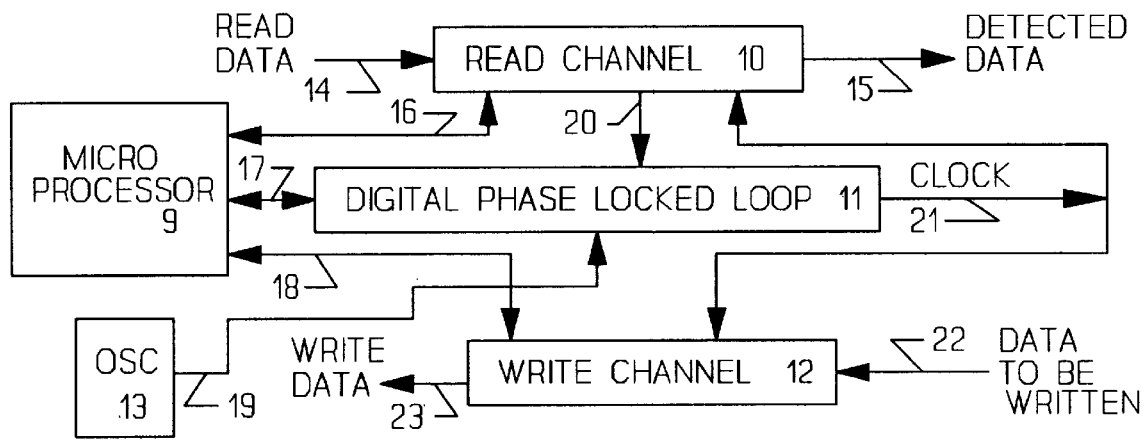
FIG. 2 is a block diagram of a disk drive system comprising the invention.

FIG. 2 shows a disk drive system that embodies the invention which includes a microprocessor 9 for controlling the overall operation of the disk drive system, a read channel 10 for recovering data read from the disk, a write channel 12 for writing data onto the disk and a digital phase locked loop 11 for providing a read clock to the read channel 10 and a write clock to write channel 12, and a reference oscillator 13 connected to the phase locked loop 11 to act as the center frequency of operation of the phase locked loop to which correction will be made.

During a write operation, the phase locked loop 11, in response to control signals from microprocessor 9 on bus 17, locks up on a frequency determined by the ID VFO field of the record that is to be written. The phase locked loop will then be maintained at the acquired frequency during the write operation and the clock output of the phase locked loop is provided as the write clock via line 21 to the write channel 12. The write channel 12 in response to control signals on bus 18 from microprocessor 9 generates write data on line 23 from the data to be written on line 22.

Figure 4:
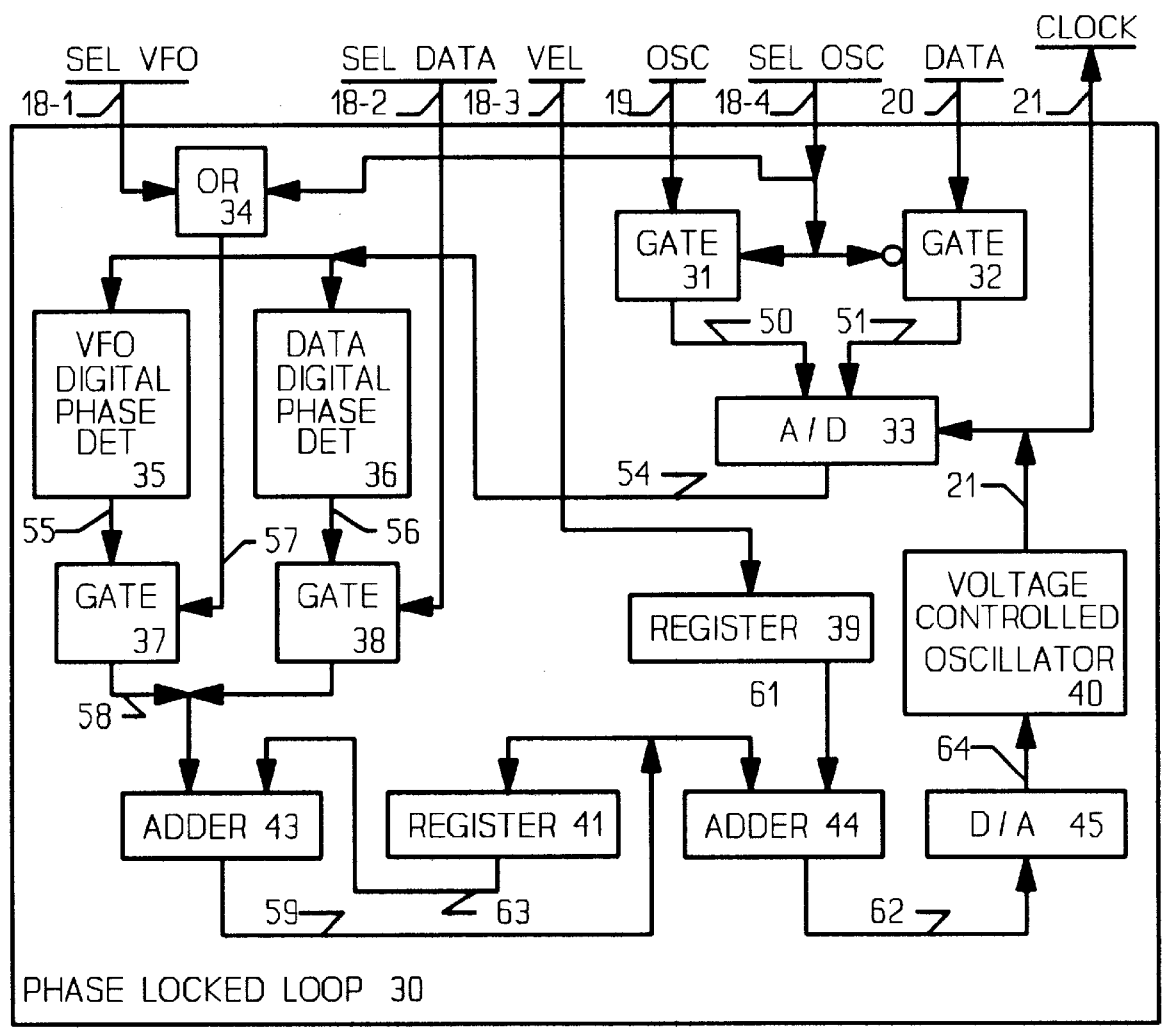
FIG. 4 is a logic diagram of the digital phase locked loop comprising the apparatus of the invention.

FIG. 4 shows the logic for digital phase locked loop 30 which embodies the invention. Phase locked loop 30 receives control signals from microprocessor 9 on bus 17, read data from read channel 10 on line 20, the output signal from reference oscillator 13 on line 19 and provides at different times a read clock on line 21 to read channel 10 and a write clock on line 21 to the write channel 12.

The frequency Fo of the output of reference oscillator 13 is one fourth of the center frequency Fn where center frequency Fn is the frequency at which data is to be written when the spindle motor operates at the spindle motor's nominal speed. A plurality of reference oscillators can be used, where each oscillator defines a center frequency for different bands of tracks on the disk surface. The reference oscillator is selected for the band of tracks which contains the address of the data record to be written during a seek operation if the address of the record to be written is not already in the band of tracks presently selected. For ease of understanding, only one reference oscillator is used in the discussion of this invention.

The speed of the spindle motor of the disk drive system is monitored to detect differences between the specified nominal speed for the spindle motor and the actual speed of the spindle motor. Microprocessor 9 generates a speed correction value which is used by a spindle motor controller (not shown) to return the spindle motor back to the spindle motors nominal speed. Microprocessor 9 also generates a digital correction value for use by the phase locked loop 30 that would change the write clock frequency of the phase locked loop 30 so as to compensate for the variation in speed of the spindle motor. For example, if the spindle motor's speed was 1% lower than the spindle motors nominal speed then the wavelength of the data written on the disk would be 1% longer and the written data frequency would be 1% lower than the write clock frequency. Microprocessor 9 generates a correction value to increase the clock frequency of the phase locked loop by 1% above the center frequency Fn so as to shorten the wavelength of the data written on the disk by 1%. This has the net effect of having the data written at the same wavelength as data that would have been written with the spindle motor operating at the spindle motors nominal speed. The correction value VEL on line 18-3 is updated periodically and stored in register 39.

Reference oscillator 13 is more stable than the voltage controlled oscillator 40. Therefore, microprocessor 9 will raise the SEL OSC signal on line 18-4 of bus 18 during idle record time, that is whenever a record is not being read from or written to by the disk drive system such that the voltage controlled oscillator 40 will be maintained at the center frequency Fn by oscillator 13. At this same time microprocessor 9 will store a correction value VEL of zero in register 39 such that voltage controlled oscillator 40 will only be controlled by reference oscillator 13 and will acquire the frequency and phase of center frequency Fn.

When SEL OSC signal is raised on line 18-4, the sine wave output of the reference oscillator 13 is passed through gate 31 to analog to digital convertor (A/D) 33 via line 50. The square wave read or write clock from voltage controlled oscillator 40 is connected to analog to digital convertor 33. Analog to digital convertor 33 samples the sine wave signal on line 19 from oscillator 13 upon detecting each leading edge of the square wave clock on line 21 from voltage controlled oscillator 40. Each sine wave will be sampled four times, two times during the positive excursion of the sine wave generating two positive digital samples and two times during the negative excursion of the sine wave generating two negative digital samples. The digital samples generated by analog to digital convertor 33 are sequentially transferred via bus 54 to VFO digital phase detector 35.

VFO digital phase detector 35 derives from each pair of positive and negative digital samples a digital correction signal for changing the clock frequency of voltage controlled oscillator 40 such that the two digital samples in each positive and negative digital sample pair have the same value. The digital correction signal is transferred to gate 37 via bus 55.

When either SEL OSC signal on line 18-4 is raised or SEL VFO signal is raised on line 18-1, the output of or 34 on line 57 will be raised so as to condition gate 37. When gate 37 is conditioned, the digital correction signals sequentially pass through gate 37 onto bus 58 to an input of adder 43.

Register 41 is an accumulator register which stores an accumulated correction value. When a digital correction signal is received by adder 43, adder 43 adds the contents of register 41 appearing on bus 63 with the present digital correction signal appearing on bus 58 to form a accumulated correction signal which is transferred via bus 59 to register 41 for storage and to adder 44. Register 41 contains the algebraic sum of all the preceding digital correction signal appearing on bus 58.

Adder 44 adds the accumulated correction signal on bus 59 to the contents of register 39 appearing on bus 61 to form a total correction signal. The total correction signal is transferred via bus 62 to the digital to analog convertor (D/A) 45. At this time, the contents of register 39 is zero and therefore the total correction signal is equal to the accumulated correction value signal from adder 43. Digital to analog convertor 45 converts the digital total correction signal to an analog correction signal. The analog correction signal is transferred via line 64 to voltage controlled oscillator 40 for controlling the frequency of voltage controlled oscillator 40.

The phase locked loop is complete such that the frequency of the voltage controlled oscillator 40 will be maintained at the desired frequency Fn. When this occurs the sequential error correction signal from VFO digital phase detector 35 will be zero. Register 41 will have the accumulated correction value necessary to maintain the voltage controlled oscillator's 40 frequency at frequency Fn and the accumulated correction signal on bus 59 will have a constant value equal to the accumulated correction value stored in register 41.

Microprocessor 9 will lower SEL OSC signal on line 18-4 and transfer the current digital speed correction value VEL via bus 18-3 to register 39. Adder 44 will now generate a total digital correction signal on bus 62 by adding the accumulated correction signal on bus 59 to the speed correction signal appearing on bus 61. The total correction signal on bus 62 contains the correction necessary to have the voltage controlled oscillator 40 operate at frequency such that the data written on the disk will be at the write clock frequency Fn.

However due to the variations in the output frequency of the voltage controlled oscillator 40 and the variation in the speed of the spindle motor during the periodic updates of the speed correction data, the data written during a write operation will vary in frequency from the frequency Fn and the data read during a read or write operation will have a frequency that varies from frequency Fn.

To further reduce the possible difference in frequency between the data in the format area and the data in the data area of a given record, the data read from the format field during a write operation is used to update register 41 during a write operation such that the resulting output frequency of voltage controlled oscillator 40 will cause the data to written on the disk to have the same wavelength as the data read from the disk for the record being written.

Figure 3:
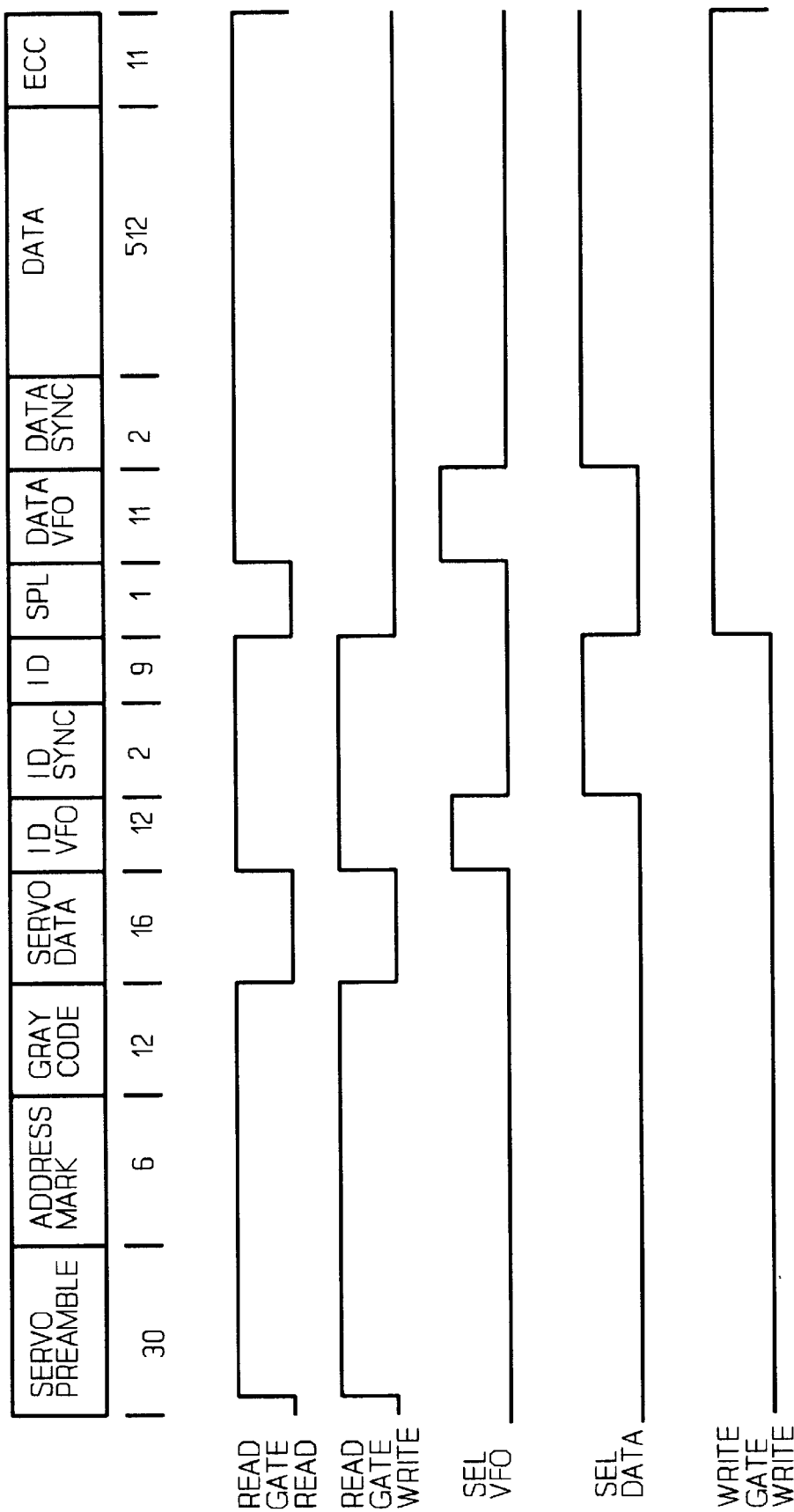
FIG. 3 is a diagram showing the fields of a record as recorded on a disk and the control signal generated by the microprocessor during a read and write operation.

Referring to FIGS. 3 and 4, microprocessor 9 generates a SEL VFO signal to gate the sequential error correction signal generated by VFO digital phase detector 35 from the VFO data in the I.D. VFO field onto bus 58 for processing by the phase locked loop. Microprocessor 9 generates a SEL DATA signal to gate the sequential error correction signals generated by data digital phase detector 35 from the data in the I.D. sync field and the I.D. field onto bus 58 for processing by the phase locked loop. The data recorded in the VFO field is a sine wave at the frequency of Fn/4 whereas the data in all other format area fields except the servo field are dibits with frequency of Fn. Frequency Fn is equal to the center frequency for each band of tracks where more than one oscillator 13 is used.

During a write operation for a record, data is passed through gate 32 to analog to digital convertor 33 and the sequential digital samples are transferred to the VFO digital phase detector 35 and the data digital phase detector 36. At the proper time, microprocessor 9 raises the SEL VFO signal on line 18-1 such that the sequential error correction signals derived from the sine wave data in the format I.D. VFO field will be passed through gate 37 onto bus 58 to update the accumulated correction value in register 41 to a value that would cause the data to be written in the data area to have the same wavelength as the VFO data read from the I.D. VFO field.

The SEL VFO signal is then lowered and the SEL DATA signal is raised. This results in the sequential error correction signal generated from the dibit data in the I.D. sync field and the I.D. fields by the data digital phase detector 36 to be passed through gate 38 onto bus 58 for processing by the phase locked loop. At this time the phase locked loop is tracking the frequency of the data in the two I.D. fields. Various data digital phase detectors exist in the art and the data digital phase detector used herein is the heretofore referenced data digital phase detector.

Therefore the I.D. VFO field is used to acquire the frequency of the data read from the data record to be written and the I.D. sync field and the I.D. field is then used to track the frequency of the data read for the record to be written. This procedure allows the most up to date value for the accumulated error signal to be stored in register 41 before the writing of the data into the data area of the record to be written by the write channel 12.

The SEL DATA signal in then lowered which will freeze the contents of register 39 after the I.D field has been completely read thereby causing the last value for the accumulated correction signal on bus 59 to be added to the speed correction signal appearing on bus 61. This results in a constant total correction signal to appear on bus 62 during the time that the write gate is raised and the voltage controlled oscillator 40 will be maintained at the frequency of the data read from the format area during the entire write operation.

The same procedure is used during a read operation for the format area. When the data area is read, the sine wave data in the data VFO field is used to acquire the frequency data in the data area. The frequency of the VFO data should be close to the frequency of the data in the format area and therefore the phase locked loop should acquire both frequency and phase lock quickly. It should be noted that even if the VFO data is at the same frequency as the format data, the phase of the two signals may still differ and therefore phase lock of the data frequency must still be acquired.

After the frequency of the write data has been acquired, the write data frequency is then tracked by use of data phase detector 36 while the data is being read from the data area.

While this invention has been described using a digital phase locked loop, it is well within the abilities of one skilled in the art to embody this invention in an analog phase locked loop. Further while the invention has been particularly shown and described with reference to the described embodiment therefore, it will be understood by those skilled in the art that changes in form and detail may be made therein without departing from the spirit and scope of the invention. Given the above disclosure of general concepts and specific embodiments, the scope of the protection sought is defined by the following.

What is claimed is:

1. An apparatus for generating an adjusted clock signal having a frequency and phase based on format data in a record stored on a rotating disk in a disk drive system, the apparatus comprising:

means for reading the format data in the record stored on the rotating disk;

a phase locked loop responsive to the format data for generating a first clock signal;

means for monitoring actual rotational speed of the rotating disk; and means responsive to the monitoring means for controlling the phase locked loop to adjust the first clock signal to have a frequency and phase that is compensated for changes in the actual rotational speed of the rotating disk.

2. The apparatus of claim 1 further comprising means for writing data into the record stored on the rotating disk with a frequency and phase controlled by the adjusted clock signal.

3. The apparatus of claim 2 wherein the means for controlling the phase locked loop further comprises a hold circuit for maintaining constant the frequency and phase of the adjusted clock signal when the writing means is writing data into the record.

4. The apparatus of claim 3 wherein:

the phase locked loop is a digital phase locked loop which generates a digital correction value used for controlling the frequency and phase of a voltage controlled oscillator; and the hold circuit comprises an interrupt means for preventing the digital correction value from being changed when the writing means is writing data into the record.

5. An apparatus for writing data during a WRITE operation into a data portion of a record stored on a rotating disk in a disk drive system, where the record has a format portion and the data portion and the rotating disk has a nominal speed, the apparatus comprising:

means for monitoring actual rotational speed of the rotating disk in the disk drive system;

means for reading format data from the format portion of the record during the WRITE operation;

means for generating during the WRITE operation, as a function of the format data read from the format portion of the record, a clock signal that has a frequency and phase equal to the frequency and phase of the format data read from the format portion of the record; and means for compensating the generated clock signal during the WRITE operation, as a function of the actual rotational speed of the rotating disk, to produce a corrected clock signal; and means for writing data into the data portion of the record, controlled by the corrected clock signal, so that data written during the WRITE operation has a frequency and phase equal to the frequency and phase that the format data read from the format portion of the record would have had if the disk were rotating at its nominal speed.

6. A method of writing data during a WRITE operation into a data portion of a record stored on a rotating disk in a disk drive system, where the record has a format portion and the data portion and the rotating disk has a nominal speed, the method comprising the steps of:

monitoring actual rotational speed of the rotating disk in the disk drive system;

reading format data from the format portion of the record during the WRITE operation;

generating during the WRITE operation, as a function of the format data read from the format portion of the record, a clock signal that has a frequency and phase equal to the frequency and phase of the format data read from the format portion of the record; and compensating the generated clock signal during the WRITE operation, as a function of the actual rotational speed of the rotating disk, to produce a corrected clock signal; and writing data into the data portion of the record, controlled by the corrected clock signal, so that data written during the WRITE operation has a frequency and phase equal to the frequency and phase that the format data read from the format portion of the record would have had if the disk were rotating at its nominal speed.

7. An apparatus for controlling the frequency and phase of data written into a data portion of a record on a rotating disk in a disk drive system during a WRITE operation, the record having a format portion comprised of a plurality of format fields and the data portion and the rotating disk having a nominal rotational speed, the apparatus comprising:

a microprocessor for monitoring actual rotational speed of a disk in the disk drive system to determine a deviation of the actual rotational speed from the nominal rotational speed, and for generating control signals to control the WRITE operation;

a read channel for reading format data from the format portion of the record during the WRITE operation in response to the control signals generated by the microprocessor;

a phase locked loop, in response to the control signals generated by the microprocessor, for receiving the format data read by the read channel during the WRITE operation and for generating a clock having a frequency and phase that is equal to the frequency and phase of the format data read from the format portion of the record compensated for deviation in the actual rotational speed of the disk from its nominal speed; and a write channel for writing data into the data portion of the record during the WRITE operation in response to the control signals generated by the microprocessor and the clock generated by the phase locked loop, where the data written into the data portion has the same frequency and phase as the frequency and phase that the format data read by the read channel from the format portion of the record would have had if the disk were rotating at its nominal speed.

8. The apparatus of claim 7 further comprising:

a gate connected to the read channel and the phase locked loop, the gate selectively providing to the phase locked loop, in response to the control signals generated by the microprocessor, at least one format field of the plurality of format fields in the format portion of the record read by the read channel.

9. The apparatus of claim 7 wherein the phase locked loop further comprises:

a hold circuit for maintaining constant the frequency and phase of the clock when the write channel is writing data into the data portion of the record.

10. The apparatus of claim 9 wherein:

the phase locked loop is a digital phase locked loop which generates a digital correction value used for controlling the frequency and phase of a voltage controlled oscillator; and the hold circuit comprises an interrupt means for preventing the digital correction value from being changed when data is being written into the data portion of the record.

11. The apparatus of claim 7 wherein:

the read channel reads format data from a synchronization field and at least one other field of the plurality of format fields in the format portion of the record; and the phase locked loop generates a clock having a frequency and phase equal to the frequency and phase that the format data read from the synchronization field and the at least one other field by the read channel would have had if the disk were rotating at its nominal speed.

* * * * *